Dec. 23, 1958 D. DAVIDOFF 2,866,161

FREQUENCY SHIFT KEYING CIRCUIT

Filed Sept. 25, 1956

Inventor
DORSEY DAVIDOFF
By Percy P. Lantzy
Attorney

United States Patent Office 2,866,161

Patented Dec. 23, 1958

2,866,161

FREQUENCY SHIFT KEYING CIRCUIT

Dorsey Davidoff, New York, N. Y., assignor to International Telephone and Telegraph Corporation, Nutley, N. J., a corporation of Maryland Application September 25, 1956, Serial No. 611,967

5 Claims. (Cl. 332—19)

This invention relates generally to frequency modulation and in particular to a signalling system wherein the mark and space intelligence is produced by frequency shift keying apparatus.

Frequency shift signalling systems are well known in the prior art. Frequency shift signalling systems are characterized by having two frequencies $f_1$ and $f_2$ passed to a receiver with, for instance, $f_2$ representing a mark and $f_1$ representing a space. Originally in the art in many of these frequency shift signalling systems, the keying operation was really a switching operation which passed to an output one of two stable frequencies $f_1$ or $f_2$. Both $f_1$ and $f_2$ were usually derived from different stable fixed frequency sources such as a pair of crystal oscillators. For instance, $f_2$ representing a mark was transmitted so long as the keying voltage permitted the passage of $f_2$ by controlling a switch, and $f_1$ was transmitted when the keying voltage is removed. These systems provided stability of the signal, but had an inherent disadvantage in that the transition from the first to the second frequency spawned a family of spurious signals.

In the conventional systems in the art at present, a single stable fixed frequency source has been used and to this source there is added at least another frequency in order to effect the modulation necessary to create mark and space intelligence. The general design of the systems because of the inherent drifting in such systems has resulted in using a 200 kc. oscillator for the controllable frequency source because it has been found that 200 kc. is at a low enough frequency value to give stability when adding an interpolation and yet high enough to be able to cut off any resultant side bands. The carrier signal as a result is usually 200 kc. from the assigned channel signal in order to effect the signalling on an assigned channel. This design however has serious limitations in that for any assigned telegraphy channel, the frequency shift keying system must be accomplished by a 200 kc. offset signal.

It is an object of this invention to provide an improved frequency shift keying system whose efficient operation is not limited by a particular offset frequency source.

It is a further object of this invention to provide a frequency shift keying system whose output has a maximum of stability while not giving rise to spurious signals.

One of the main features of my invention that renders the above objects possible is the time sharing of a first controllable frequency source which is corrected by a stable fixed frequency source and in turn passes a correction to a second controllable frequency source. By coupling a coherent detector and a reactance circuit between a stable fixed frequency source and a first controllable frequency source, the frequency output of the first controllable source is phase locked to the fixed frequency source. The coherent detector can be of the type described on page 546 in volume 11 of the "MIT Radiation Laboratory Series," published by McGraw-Hill, 1947. Any mixer device such as a synchronous detector, balanced modulator, etc., which has two A. C. inputs A+B and one D. C. output equal to $/A+B/-/A-B/$ will suffice to perform in the role of the coherent detector. The frequency output for said first controllable frequency source is thereby continually corrected by the fixed frequency source. A second controllable frequency source is then coupled through a coherent detector and an associated reactance circuit to the first controllable frequency source, thus phase locking the two controllable sources. By coupling a switching device such as a free-running multivibrator to each of the reactance circuits through gating devices such that one half of the multivibrator output renders one of the reactance circuits operative and the other half of the multivibrator output renders the other reactance circuit operative, the first controlled frequency source is phase locked to the fixed frequency source and alternately the second controllable frequency source is phase locked to the first controllable frequency source. The circuitry provides for the correction of the first controllable frequency source output received in accordance with the fixed frequency source during one half of the multivibrator operation, said correction being passed to the second controllable frequency source during the second half of the multivibrator operation. In order to obtain signal intelligence, there is then coupled to the system a keying voltage input. This keying voltage is passed to the first reactance circuit through a gating device which is gated by the multivibrator and directly to a second reactance circuit without passing through a gating device. When the keying voltage is applied, the second controllable frequency source immediately goes to $f_2'$ which is an $f_2$ signal with a lesser stability than the corrected $f_2$ output and as soon as the correction is passed as described below remains at $f_2$ as long as the key is depressed because the keying voltage is tied directly to the reactance circuit of the second controllable frequency source. For purposes of this discussion $f_2$ represents the mark intelligence of the system output. The first controllable frequency source goes to $f_2$ during the key depression only when the lower half of the multivibrator is conducting since this conditions gating device No. 2 allowing the keying voltage to operate on the first reactance circuit. Simultaneously with the above, the multivibrator conditions gating device No. 3 so that the first controllable frequency source is phased-locked to the second controllable frequency source and $f_2$ is passed to the second coherent detector from both the controllable frequency sources with the second controllable frequency source being corrected during this portion of the multivibrator operation. With the keying voltage blocked through gating device No. 2 during the next portion of the multivibrator operation, the first reactance circuit causes the first controllable frequency source to be phase-locked to the fixed frequency source and hence a correction is accomplished every other half of the multivibrator operation. In the conventional F. S. K. systems the mark and space signals are actually represented by two frequencies which are symmetrically disposed about the carrier frequency. Although the present invention disclosure outlines a system where the assigned frequency also represents the space frequency, it is clear that by applying the proper F. S. K. votlages to the "keying voltage input," the resultant frequencies developed would be $f_2$ and $f_3$ which could be symmetrically disposed about $f_1$. In order to make the circuit most effective, it is preferable to have oscillation rate of the multivibrator very high compared to the possible rate of the keying.

The above-mentioned and other features and objects of this invention will become more apparent by reference to the following description taken in conjunction with the accompanying drawings, in which.

Figure 1:
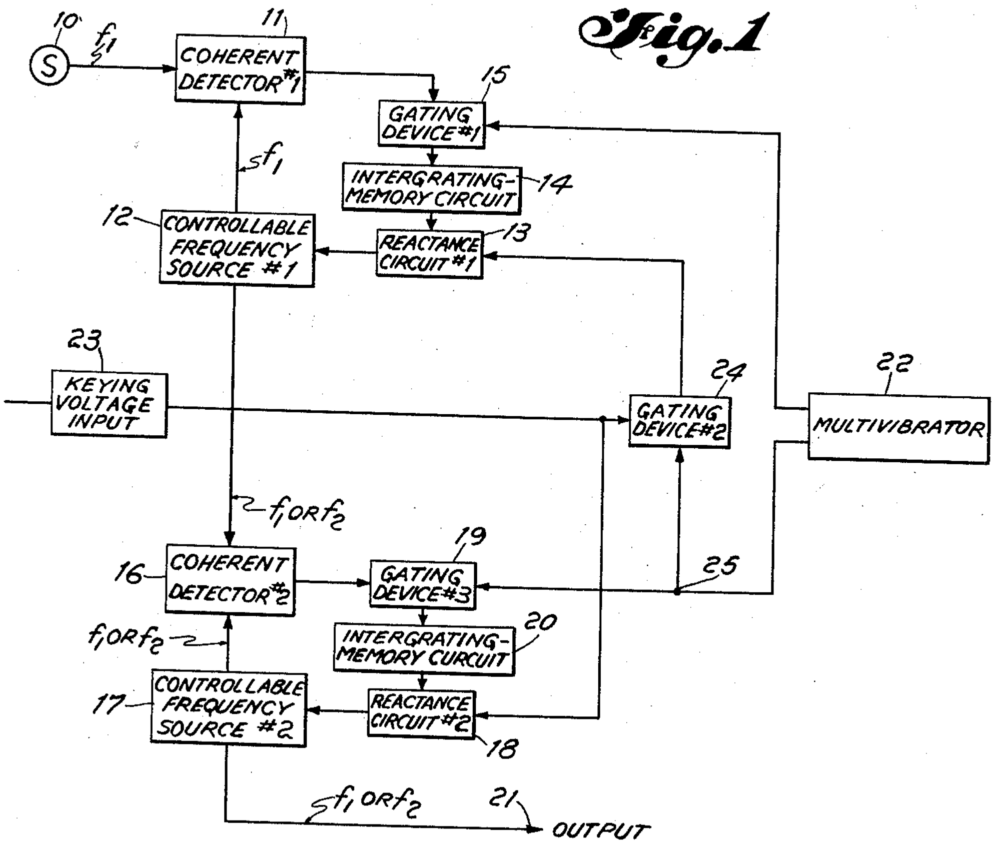
Fig. 1 is a block diagram of the system.

In Fig. 1 there is a stable fixed frequency source such as a crystal oscillator shown at 10 which is connected to a coherent detector at 11. There is also connected to the coherent detector 11 a controllable frequency source shown at 12. Coupled between the output of the coherent detector 11 and the controlled frequency source at 12 there is a reactance circuit 13, an integrating-memory circuit 14 and a gating device 15. A similar lower half of the circuit is shown with a coherent detector at 16 coupled to the outputs of each of the controllable frequency sources 12 and 17. In a like fashion to the upper half of the circuit there is a reactance circuit 18, a gating device 19, an integrating-memory circuit 20 serially coupled between the coherent detector 16 and the controllable frequency source 17. The output of the system shown at 21 is connected to the output of the second controllable frequency source 17. There is a continually running switching device shown as a multivibrator 22 coupled to both of the gating devices at 15 and 19. The keying voltage input at 23 is coupled to a gating device 24 and rectance circuit 18. The gating device 24 is in turn coupled to the first reactance circuit at 13 and to the output of one half of the multivibrator at 25. The operation of the circuit becomes more comprehensive with the following description.

Figure 2:
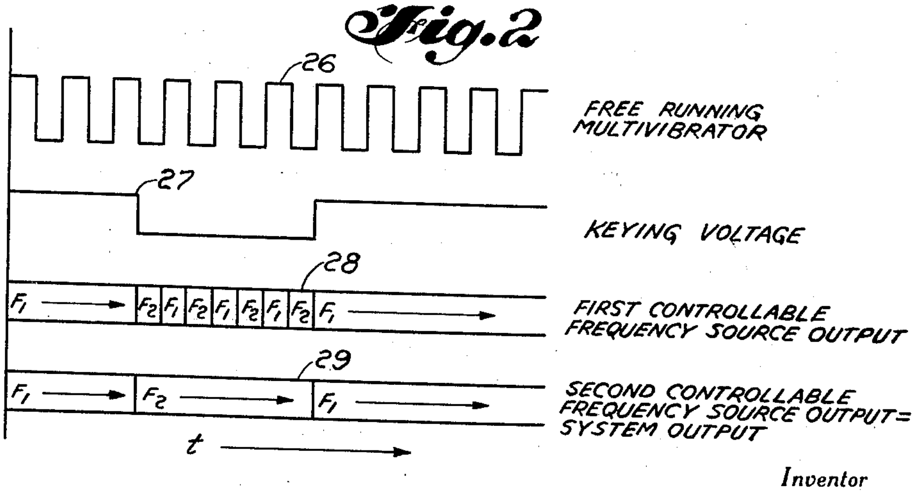
Fig. 2 is a graphic display showing the time relation of the signals.

In Fig. 1 there is a stable fixed frequency output at 10, for reference called $f_1$ which is passed to a first coherent detector at 11. There is also passed to the first coherent detector a frequency output of the first controllable frequency source at 12 which because of the design of this source is also an $f_1$ signal which we shall call $f_1'$ to indicate an $f_1$ signal with a lesser stability than the $f_1$ signal emanating from 10. Assuming the gating device at 15 is open, the two $f_1$ signals are compared at the coherent detector and a difference signal is passed to the reactance circuit at 13 through the integrating-memory circuit 14, which phase locks the first controllable frequency source at 12 to the fixed frequency source at 10 hence $f_1'$ becomes $f_1$. The second controllable frequency source at 17 passes an $f_1'$ signal to the coherent detector 16 and at the same time there is also connected to the coherent detector 16 the output of the first controllable frequency source 12, which once the system is operating passes an $f_1$ signal rather than an $f_1'$ signal, to the second coherent detector at 16. The two $f_1$ signals are compared and a difference signal is passed to a gating device 19 then to an integrating-memory circuit at 20 and on to the reactance circuit at 18 which phase-locks the second controllable frequency source at 17 to the first controllable frequency source at 12, hence the output of the second frequency source 17 is $f_1$ rather than $f_1'$ after the signal system has begun to operate. In a normal phase-locking loop, there is an inherent time constant circuit and very often this circuit is part of the reactance circuit. For purposes of illustration and clarity, a time constant circuit is herein considered as part of the integration-memory circuit as shown at 14 and 20. Continuous comparing, correcting and locking the $f_1$ signals result in a system output of $f_1$ being a stable fixed frequency. A switching device such as a multivibrator at 22 is connected to the gating devices at 15 and 19 whereby on alternate halves of the multivibrator output the first controllable frequency source at 12 is phase-locked to the fixed source at 10 and during the second half the second controllable frequency source at 17 is locked to the first controllable frequency source at 12. This switching device directs the correction by the fixed frequency source at 10 to be passed to the first controllable frequency source at 12 during one half of a multivibrator operation and relayed to the second controllable frequency source at 17 during the other half of the multivibrator operation. Since the multivibrator operates at a very high rate and the memory aspect of the circuits at 14 and 20 are operative, the first controllable frequency source and the second controllable frequency source can remember the corrections during the period they are respectively locked and unlocked. In order to modulate the output for purposes of mark and space signal intelligence, there is coupled to the first reactance circuit 13 a keying voltage input at 23. This input is coupled through a gating device at 24 which is in turn coupled to the lower half of the multivibrator output at 25 so that the keying voltage input is only applied at the first reactance circuit 13 during the time that the second controllable frequency source 17 is phase-locked to the first controllable frequency source 12. The keying voltage is blocked by the gate 24 during the time that the first controllable frequency source 12 is locked to the fixed frequency source 10. When the keying voltage is applied, the controllable frequency source 17 goes to $f_2'$ as described above and assuming an open gate at 24 the controllable frequency source 12 goes to $f_2$. The $f_2'$ and $f_2$ signals are passed to the coherent detector at 16 and since gate 19 is opened according to our previous assumption, the difference signal is passed to the integrating-memory circuit 20 where the error signal is integrated and stored for a predetermined time to condition the reactance circuit to phase-lock the frequency sources 12 and 17 at $f_2$. It is conceivable that the F. S. K. voltage need not be directly tied to the reactance tube No. 2 as shown in the embodiment, provided the time constant were long enough. As shown in the embodiment there is a comparison of $f_2'$ with $f_2$ which is preferable to $f_2$ with $f_1$. Returning to the circuit as shown we find that once the key is depressed there is an $f_2$ output of the system representing a mark signal intelligence and this $f_2$ output from 17 will be an $f_2$ signal which will be continually corrected by a stable $f_1$ signal, eliminating the drift and accomplishing the purpose of the invention. As discussed above with the proper F. S. K. voltages applied at 23 there could be a resultant output of $f_2$ and $f_3$ and these two frequencies would be symmetrically disposed about $f_1$. The comparison, correction and locking of each of the latter individual frequency signals, if two F. S. K. voltages were applied, however, would be the same as that described above where just one F. S. K. voltage is applied. In Fig. 2 there is shown a graphic relationship between the switching of the multivibrator at 26, the keying voltage at 27, the first controllable frequency source at 28, and the second controllable frequency source at 29. It can be seen that the first controllable frequency source operates between $f_2$ and $f_1$ as it is time-shared, and that the output of the system results in an $f_2$ output so long as the key is depressed.

While I have described above the principles of my invention in connection with specific apparatus it is to be clearly understood that this description is made only by way of example and not as a limitation to the scope of my invention, as set forth in the objects thereof and in the accompanying claims.

I claim:

1. A frequency shift signalling system for transmitting a mark and space form of signal intelligence comprising a stable fixed frequency source input, first and second controllable frequency sources, a continually operating switching device, a keying voltage input means, a first frequency locking circuit for coupling said first controllable frequency source to said fixed frequency source for frequency locking the outputs thereof, a second frequency locking circuit for coupling said second controllable frequency source to said first controllable frequency source and locking the outputs thereof, circuitry means to couple said switching device to said first and second frequency locking circuits causing the output of said first controllable frequency source to be alternately shifted between the inputs thereof, and circuitry means to couple said keying voltage input means to said frequency locking circuits to alter the frequency signal output so as to represent mark and space signals.

2. A frequency shift signalling system as recited in claim 1, wherein said first frequency locking circuit includes a coherent detector device and a reactance circuit, said coherent detector coupled to receive signal outputs from said fixed frequency source and said first controllable frequency source respectively and said reactance circuit coupled to said coherent detector and said first controllable frequency source in order to effect said output frequency locking thereof.

3. A frequency shift signalling system as recited in claim 1, wherein said second frequency locking circuit includes a coherent detector device and a reactance circuit, said coherent detector coupled to receive signal outputs from said first controllable frequency source and said second controllable frequency source, and said reactance circuit coupled to said coherent detector and said second controllable frequency source in order to effect said output frequency locking thereof.

4. A frequency shift signalling system as recited in claim 1, wherein said continually operating switching device comprises a free-running multivibrator.

5. A frequency shift signalling system for transmitting a mark and space form of signal intelligence comprising a fixed frequency source input, a first controllable frequency source, a first coherent detector device coupled to the respective outputs of said fixed frequency source and said first controllable frequency source, a first reactance circuit including a gating device and an integrating-memory circuit coupled between said first coherent detector and said first controllable frequency source to frequency lock the outputs of said fixed frequency source and said first controllable source, a second controllable frequency source, a second coherent detector device coupled to the output of said second controllable source and said first controllable source, a second reactance circuit including a gating device and an integrating-memory circuit coupled between said second coherent detector and said second controllable source to frequency lock the outputs of said second controllable frequency source and said first controllable frequency source, a free-running multivibrator, a gating device, a keying voltage input, said multivibrator coupled to said first and second reactance circuits in order that the output of said first controlled frequency source is shared non-concurrently and alternately between said first coherent detector and said second coherent detector, and circuitry means to couple said keying voltage input through said gating device to said first and second reactance circuits in order to modulate the frequency output of said first controllable frequency source during one half of the multivibrator output and block said keying voltage input during the other half of the multivibrator output so as to cause mark and space signals whose frequency is stabilized through constant correction by said stable fixed frequency source.

References Cited in the file of this patent

UNITED STATES PATENTS 2,431,649 Peterson ---------------- Feb. 15, 1944